United States Patent
Conradt et al.

(10) Patent No.: US 8,792,721 B2
(45) Date of Patent: *Jul. 29, 2014

(54) IMAGE RECOGNITION OF CONTENT

(71) Applicant: Microsoft Corporation, Redmond, WA (US)

(72) Inventors: Jonathan L. Conradt, San Jose, CA (US); Juan G. Menendez, Sunnyvale, CA (US)

(73) Assignee: Microsoft Corporation, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/922,925

(22) Filed: Jun. 20, 2013

(65) Prior Publication Data

US 2013/0301916 A1 Nov. 14, 2013

Related U.S. Application Data

(63) Continuation of application No. 13/427,596, filed on Mar. 22, 2012, now Pat. No. 8,548,244, which is a continuation of application No. 11/936,118, filed on Nov. 7, 2007, now Pat. No. 8,170,342.

(51) Int. Cl.
*G06K 9/46* (2006.01)

(52) U.S. Cl.
USPC .......................................... 382/173; 382/190

(58) Field of Classification Search
USPC ......... 392/163, 173, 181, 190, 191, 254, 276, 392/305, 312; 382/173, 190
See application file for complete search history.

(56) References Cited

U.S. PATENT DOCUMENTS

| | | | |
|---|---|---|---|
| 6,377,995 B2 | 4/2002 | Agraharam | |
| 6,389,181 B2 | 5/2002 | Shaffer et al. | |
| 7,272,788 B2 | 9/2007 | Anderson | |
| 7,395,453 B2 | 7/2008 | Cohen et al. | |
| 7,409,144 B2 | 8/2008 | McGrath et al. | |
| 7,555,165 B2 | 6/2009 | Luo et al. | |
| 7,925,898 B2 * | 4/2011 | Shear et al. | 713/194 |
| 7,937,555 B2 | 5/2011 | Lee | |
| 7,957,991 B2 * | 6/2011 | Mikurak | 705/7.11 |
| 8,170,342 B2 * | 5/2012 | Conradt et al. | 382/191 |
| 8,515,174 B2 * | 8/2013 | Conradt et al. | 382/181 |
| 8,548,244 B2 | 10/2013 | Conradt et al. | |
| 2002/0188602 A1 | 12/2002 | Stubler | |
| 2006/0015497 A1 | 1/2006 | Keating et al. | |
| 2006/0072811 A1 | 4/2006 | Porter | |
| 2006/0170791 A1 | 8/2006 | Porter | |
| 2006/0221190 A1 | 10/2006 | Limberis | |
| 2006/0269135 A1 | 11/2006 | Ramsay et al. | |
| 2006/0269140 A1 | 11/2006 | Ramsay et al. | |

(Continued)

OTHER PUBLICATIONS

Non-Final Office Action, U.S. Appl. No. 11/936,118, (Jun. 13, 2011),9 pages.

(Continued)

*Primary Examiner* — Sheela Chawan
(74) *Attorney, Agent, or Firm* — Micah Goldsmith; Glen Johnson; Micky Minhas

(57) ABSTRACT

Techniques are described to employ image recognition techniques to content. In an implementation, one or more images are identified in content using a signature derived from the one or more images. Metadata associated with the content is then supplemented based on the identified one or more images.

20 Claims, 5 Drawing Sheets

(56) References Cited

U.S. PATENT DOCUMENTS

| | | |
|---|---|---|
| 2006/0288006 A1 | 12/2006 | Eschbach |
| 2008/0159605 A1 | 7/2008 | Ramsay et al. |
| 2009/0041311 A1 | 2/2009 | Hundley |
| 2009/0116702 A1 | 5/2009 | Conradt |
| 2012/0180081 A1 | 7/2012 | Conradt |
| 2012/0185891 A1 | 7/2012 | Conradt |

OTHER PUBLICATIONS

Non-Final Office Action, U.S. Appl. No. 11/936,118, (Sep. 19, 2011),6 pages.

Non-Final Office Action, U.S. Appl. No. 13/427,596, (Feb. 8, 2013),10 pages.

Non-Final Office Action, U.S. Appl. No. 13/427,596, (Nov. 21, 2012),7 pages.

Non-Final Office Action, U.S. Appl. No. 13/434,305, (Nov. 26, 2012),6 pages.

Notice of Allowance, U.S. Appl. No. 11/936,118, (Jan. 24, 2012),8 pages.

Notice of Allowance, U.S. Appl. No. 13/427,596, (May 22, 2013),9 pages.

Notice of Allowance, U.S. Appl. No. 13/434,305, (Apr. 15, 2013),8 pages.

Restriction Requirement, U.S. Appl. No. 11/936,118, (May 12, 2011),6 pages.

Davis, et al., "Towards Context-Aware Face Recognition", http://fusion.sims.berkeley.edu/GarageCinema/pubs/pdf/pdf_89FB89A7-2534-412F-A815230DFDB32CDC.pdf, (Nov. 2005) 4 pages.

Girgensohn, et al., "Leveraging Face Recognition Technology to Find and Organize Photos", http://www.fxpal.com/publications/FXPAL-PR-04-283.pdf, (Oct. 2004) 8 pages.

Naaman, et al., "Leveraging Context to Resolve Identity in Photo Albums", http://graphics.stanford.edu/~ronyeh/pubs/IdentityInPhotos.pdf, (Jun. 2005) 10 pages.

\* cited by examiner

IMAGE RECOGNITION OF CONTENT

RELATED APPLICATIONS

This application claims priority under 35 U.S.C. Section 120 as a continuation of U.S. patent application Ser. No. 13/427,596, filed Mar. 22, 2012, which claims priority to U.S. patent application Ser. No. 11/936,118, now U.S. Pat. No. 8,170,342, filed Nov. 7, 2007, and titled "Image Recognition of Content," the entire disclosures of which is hereby incorporated by reference.

BACKGROUND

As the amount of content continues to expand, so too does the difficulty in locating particular content of interest. One technique that has been employed to aide in content location involves the use of metadata. Metadata may be thought of as data that describes the content such that a user may interact with the metadata to determine characteristics of the described content and therefore differentiate content, one from another.

Metadata, for instance, may describe who created a television program, an author, actors, genre, and so on. The metadata may then be associated with the television program such that a user may navigate through the metadata to locate a television program in a particular genre (e.g., a Western), a movie having particular actors, a song from a particular artist, and so on. Even though metadata may be use to describe a variety of characteristics, this description is generally limited in actual usage. A variety of different reasons for such limited usage may be encountered, such as due to limited bandwidth available to communicate metadata, preserving storage space which may be otherwise used to store the content and even failure by content providers to recognize the functionality that may be gained by users from "rich" metadata.

SUMMARY

Techniques are described to employ image recognition techniques to content. In an implementation, one or more images are identified in content using a signature derived from the one or more images. Metadata associated with the content is then supplemented based on the identified one or more images.

In another implementation, one or more computer readable media include instructions that are executable to identify a signature of an image included in a segment of content and block output of the segment of content based on the identification.

In yet another implementation, a client includes one or more modules to navigate between a plurality of segments of content based on inclusion of an image in each of the segments.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

DETAILED DESCRIPTION

Overview

Although metadata has been traditionally employed to help describe content, traditional techniques which leveraged the content were generally limited. For example, the metadata may be used to describe general information of a television program, such as title and actor, but traditional implementations were generally limited in the amount of information provided past this basic information, which therefore also limited the usefulness of the metadata to users.

Techniques are described to employ image recognition with content. In an implementation, image recognition techniques are used to supplement metadata that is associated with content. This may be performed in a variety of ways. For example, a client (e.g., a set-top box) may receive content broadcast by a head end. Image recognition techniques may then be employed to identify images in the content. Data describing these identified images may then be used to supplement metadata, such as to identify particular actors, logos, landmarks, and so on. Further discussion of supplementing metadata may be found in relation to FIG. 3.

Image recognition may also be used to provide a variety of other functionality. Continuing with the previous example, the metadata derived from the images in the content may be identified with particular frames in the content that include those images. This may then be used to classify segments of the content based on the images contained therein. For example, a user may navigate between particular segments that include a particular corporate logo or car number to watch a favorite driver in an auto race. In another example, output of particular segments may be blocked based on the images, such as due to violence (e.g., an image includes a part of a weapon), nudity, and or is determined to be potentially harmful to children. A variety of other examples are also contemplated, further discussion of which may be found in relation to FIGS. 4-5.

In the following discussion, an exemplary environment is first described that is operable to perform techniques to perform image recognition of content. Exemplary procedures are then described that may be employed in the exemplary environment, as well as in other environments. Although these techniques are described as employed within a television environment in the following discussion, it should be readily apparent that these techniques may be incorporated within a variety of environments without departing from the spirit and scope thereof.

Exemplary Environment

Figure 1:
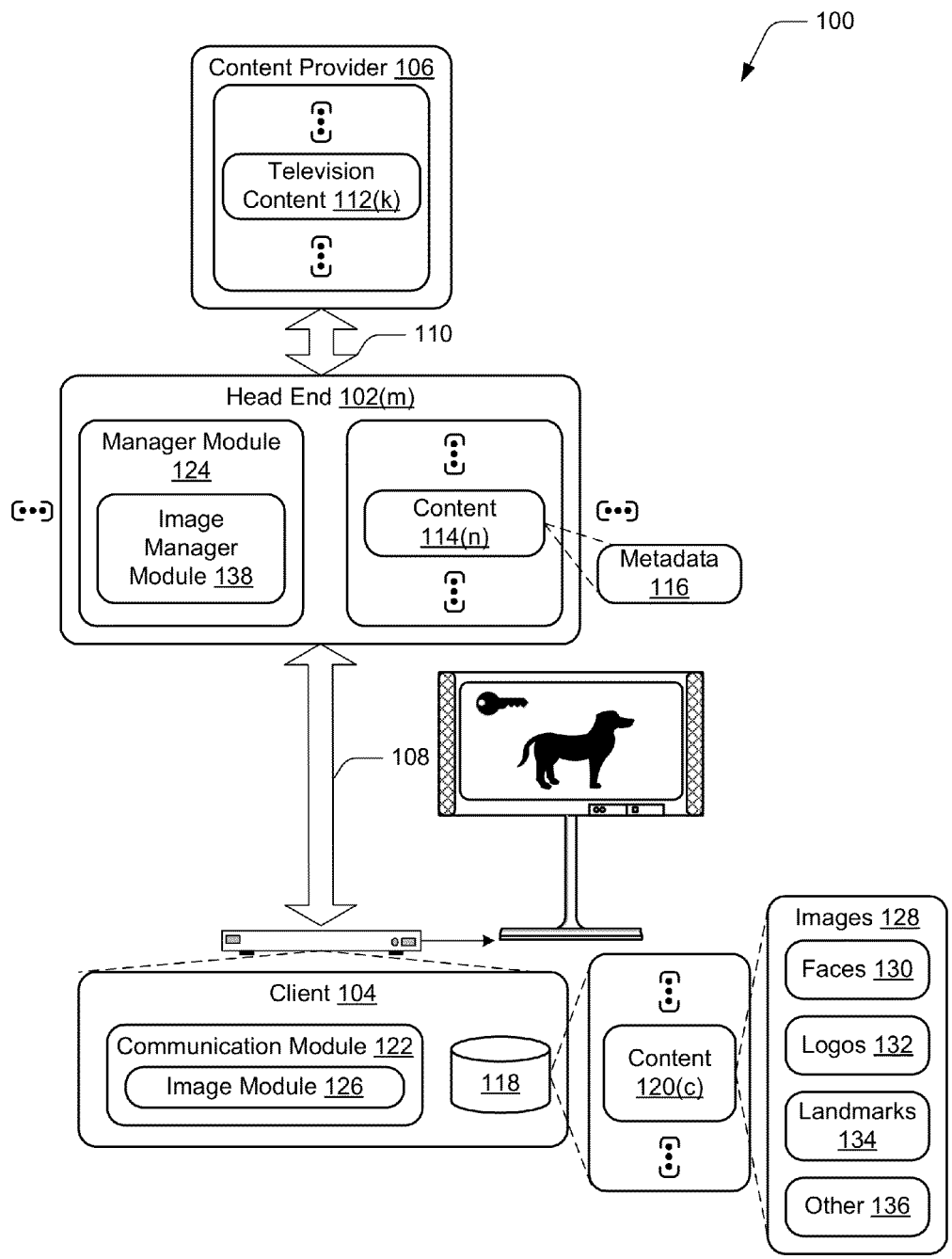
FIG. 1 is an illustration of an environment in an exemplary implementation that is operable to employ techniques to perform image recognition with content.

FIG. 1 is an illustration of an environment 100 in an exemplary implementation that is operable to employ image recognition techniques with content. The illustrated environment 100 includes one or more head ends 102(m) (where "m" can be any integer from one to "M") of a network operator, a client 104 and a content provider 106 that are communicatively coupled, one to another, via network connections 108, 110. In the following discussion, the head end 102(m) as previously described as well as the client 104 and the content provider 106 may be representative of one or more entities. Therefore reference may be made to a single entity (e.g., the client 104) or multiple entities (e.g., the clients 104, the plurality of clients 104, and so on). Additionally, although a plurality of network connections 108, 110 are shown separately, the network connections 108, 110 may be representative of network connections achieved using a single network or multiple networks. For example, network connection 108 may be representative of a broadcast network with back channel communication, an Internet Protocol (IP) network, and so on.

The client 104 may be configured in a variety of ways. For example, the client 104 may be configured as a computer that is capable of communicating over the network connection 108, such as a desktop computer, a mobile station, an entertainment appliance, a set-top box communicatively coupled to a display device as illustrated, a wireless phone, and so forth. For purposes of the following discussion, the client 104 may also relate to a person and/or entity that operate the client. In other words, client 104 may describe a logical client that includes a user, software and/or a machine.

The content provider 106 includes one or more items of content 112(k), where "k" can be any integer from 1 to "K". The content 112(k) may include a variety of data, such as television programming, video-on-demand (VOD) files, and so on. The content 112(k) is communicated over the network connection 110 to the head end 102(m).

Content 112(k) communicated via the network connection 110 is received by the head end 102(m) and may be stored as one or more items of content 114(n), where "n" can be any integer from "1" to "N". The content 114(n) may be the same as or different from the content 112(k) received from the content provider 106. The content 114(n), for instance, may include additional data for broadcast to the client 104.

One example of this additional data is illustrated in FIG. 1 as metadata 116. Metadata 116, as previously described, may include a wide variety of data that is used to describe other data, which in this instance is content 114(n). The metadata 116 may be associated with the content 114(n) in a variety of ways, such as streamed with the content over the network connection 108. Thus, distribution of the content 114(n) (and consequently the metadata 116 in this example) from the head end 102(m) to the client 104 may be accommodated in a number of ways, including cable, radio frequency (RF), microwave, digital subscriber line (DSL), satellite, via Internet Protocol (IP) connection, and so on. Although the metadata 116 is illustrated as being provided by the head end 102(m) for the sake of simplicity of the figure, it should be readily apparent that the metadata 116 may also originate from a wide variety of sources, such as a standalone third-party provider, the content provider 106, and so on.

The client 104, as previously stated, may be configured in a variety of ways to receive the content 114(n) and the metadata 116 over the network connection 108. The client 104 typically includes hardware and software to transport and decrypt content 114(n) and the metadata 116 received from the head end 102(m) for rendering by the illustrated display device. Although a display device is shown, a variety of other output devices are also contemplated, such as speakers.

The client 104 may also include digital video recorder (DVR) functionality. For instance, the client 104 may include memory 118 to record content 114(n) as content 120(c) (where "c" can be any integer from one to "C") received via the network connection 108 for output to and rendering by the display device. Thus, content 120(c) that is stored in the memory 118 of the client 104 may be copies of the content 114(n) that was streamed from the head end 102(m).

The client 104 includes a communication module 122 that is executable on the client 104 to control content playback on the client 104, such as through the use of one or more "command modes", i.e., "trick modes", to tune to a particular channel, order pay-per-view content, and so on. The command modes may provide non-linear playback of the content 120(c) (i.e., time shift the playback of the content 120(c)) such as pause, rewind, fast forward, slow motion playback, and the like.

The head end 102(m) is illustrated as including a manager module 124. The manager module 124 is representative of functionality to configure content 114(n) for output (e.g., streaming) over the network connection 108 to the client 104. The manager module 124, for instance, may configure content 112(k) received from the content provider 106 to be suitable for transmission over the network connection 108, such as to "packetize" the content for distribution over the Internet, configuration for a particular broadcast channel, map the content 112(k) to particular channels, and so on.

Thus, in the environment 100 of FIG. 1, the content provider 106 may broadcast the content 112(k) over a network connection 110 to a multiplicity of network operators, an example of which is illustrated as head end 102(m). The head end 102(m) may then stream the content 114(n) over a network connection to a multitude of clients, an example of which is illustrated as client 104. The client 104 may then store the content 114(n) in the memory 118 as content 120(c) and/or render the content 114(n) immediately for output as it is received, such as when the client 104 is configured to include digital video recorder (DVR) functionality. In another example, the client 104 may access streams of content from a plurality of head ends 102(m), further discussion of which may be found in relation to the following discussion.

The communication module 122 is also illustrated as including an image module 126 which is representative of functionality to perform image recognition techniques. For example, the image module 126 may be representative of functionality to identify a variety of images 128 in content 120(c), such as faces 130, logos 132 (e.g., a corporate logo), landmarks 134, and other 136 images such as names and/or numbers (e.g., a player's jersey, a textual warning, and so on). A variety of image recognition techniques may be employed by the image module 126 to perform this identification, such as by using colorimeter and vector analysis with a Bayesian distance, further discussion of which may be found in relation to FIG. 4.

The images 128, once identified, may then be leveraged for a variety of purposes. For example, data that describes the images and/or the location of the images 128 within the content 120(c) may be used to supplement metadata 116 already associated with the content 114(n) at the head end 102(*m*) such that a user of the client 104 may use this additional information regarding the content 120(*c*) for added functionality, such as to differentiate a particular item of content from another item of content and therefore make an informed viewing decision.

The metadata provided by the image module 126 may also be used to navigate within a single item of content 120(*c*) as well as between multiple items of content. This navigation, for instance, may be performed between a plurality of content 114(*n*) which may be obtained from a plurality of respective distributors, e.g., head ends 102(*m*). For instance, a plurality of streams of content (e.g., "feeds") may be taken from a plurality of different respective camera angles of an auto race, which are streamed to the client 104. The image module 126, in conjunction with the communication module 122, may be configured to automatically "jump" between the streams of content (e.g., from single or multiple head ends 102(*m*)) to frames or segments having the images 128, such that the user may follow a favorite driver in this instance. Further discussion of navigation between segments of content based on images identified within the content may be found in relation to FIG. 2

It should be noted that one or more of the entities shown in FIG. 1 may be further divided (e.g., the head end 102(*m*) may be implemented by a plurality of servers in a distributed computing system), combined (e.g., the head end 102(*m*) may incorporate functionality to generate the metadata 116), and so on and thus the environment 100 of FIG. 1 is illustrative of one of a plurality of different environments that may employ the described techniques. Further, although the following discussion will describe use of the image module 126 by the client 104, such functionality may be employed by a variety of different devices and/or systems, such as by an image manager module 138 of the head end 102(*m*), a third-party service, and so on.

Generally, any of the functions described herein can be implemented using software, firmware, hardware (e.g., fixed-logic circuitry), manual processing, or a combination of these implementations. The terms "module", "functionality", "engine" and "logic" as used herein generally represent software, firmware, hardware, or a combination thereof. In the case of a software implementation, for instance, the module, functionality, or logic represents program code that performs specified tasks when executed on a processor (e.g., CPU or CPUs). The program code can be stored in one or more computer-readable memory devices, such as the memory 118. The features of the techniques to employ image recognition with content are platform-independent, meaning that the techniques may be implemented on a variety of commercial computing platforms having a variety of processors.

Figure 2:
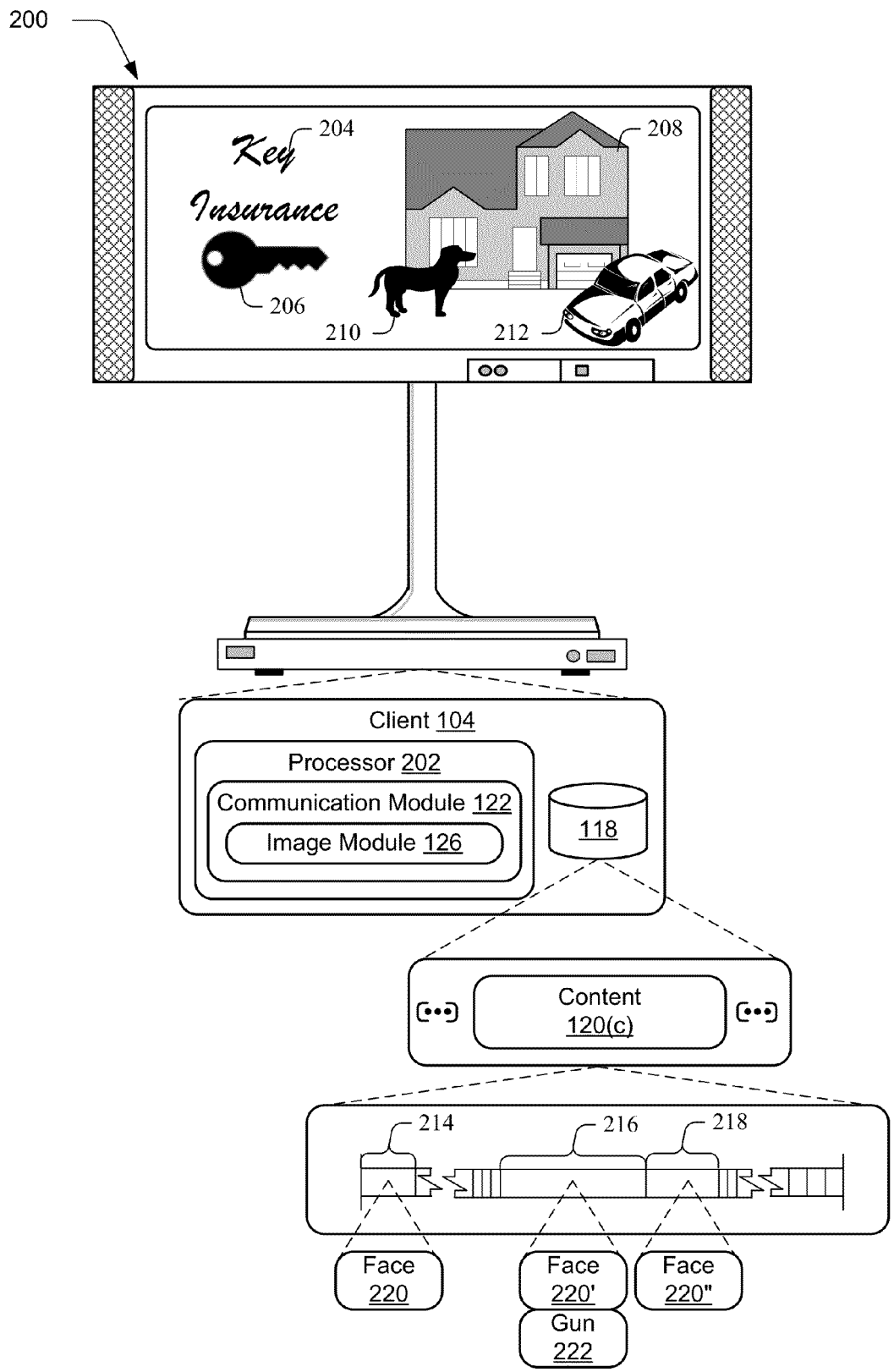
FIG. 2 illustrates an exemplary implementation of a system that shows a client of FIG. 1 in greater detail.

FIG. 2 illustrates an exemplary implementation of a system 200 that shows the client 104 of FIG. 1 in greater detail. The client 104 is illustrated as executing the communication module 122 having the image module 126 on a processor 202, which is also storable in memory 118. Processors are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions. Additionally, although a single memory 118 is shown for the client 104, a wide variety of types and combinations of memory may be employed, such as random access memory (RAM), hard disk memory, removable medium memory, and other types of computer-readable media.

The client 104 is further illustrated as outputting content 120(*c*) on a display device. The content 120(*c*) includes a variety of different images that may be identified through execution of the image module 126, such as text depicted as "Key Insurance" 204, an image of a logo that is depicted as a key 206, an image of an actor which in the illustrated instance is a dog 210, a landmark that is depicted as a house 208 and a product that is depicted as a car 212. A variety of other examples are also contemplated of images that may be identified through execution of the image module 126.

The image module 126, through execution with the communication module 122, may also track "where" in the output of the content 120(*c*) the image occurred. Once identified, the images and the respective location within the content may be leveraged in a variety of ways. For example, metadata may be associated with particular frames of the content 120(*c*) that include the images 128, such as through the use of tags, a table, and so on, such that images and their respective locations within the content 120(*c*) may be determined.

A timeline, for instance, is illustrated for the content 120(*c*) to depict a starting and stop time, in between which the content 120(*c*) is output through use of a plurality of frames, such as television programming, movies, and so on. One or more of the frames may be used to form segments of the content 120(*c*), which are illustrated as a first segment 214, a second segment 216 and a third segment 218. Navigation may then be performed between segments that includes the frames having the images, such as to move from one segment having the image to another segment having the image, block output of segments having the image (e.g., a gun with a muzzle flash), and so on.

For example, the first segment 214 is illustrated as including an image of a face 220 which corresponds to another image of the face 220' in the second segment and yet another image of the face 220" in the third segment. A user may then provide an input (e.g., through a remote control, user interface, and so on) to navigate between the segments 214-218 having the face 220, 220', 220", such as to avoid output of frames disposed between the first and second segments 214, 216.

In another example, the image module 126 may block output of segments having a particular image, such as a gun 222 in the second segment 216. Techniques may also be employed to resolve conflicts between navigation techniques, such as to permit navigation from the first segment 214 to the third segment 218 while skipping output of the second segment 216 due to the presence of the image of the gun 222. A variety of other techniques are also contemplated which may be used to resolve conflicts.

Image recognition may also be utilized in a variety of other ways. For example, the image module 126 may use metadata 116 of FIG. 1 provided by a head end 102(*m*) for content 114(*n*) to obtain signatures of actors that are included in the content 114(*n*), such as facial recognition data obtained by analysis of the image. The image module 126 may then perform facial recognition during output of the content 114(*c*) concurrently (or slightly before or after through use of a buffer) and/or when being recorded as content 120(*c*) in the memory 118. Pointers may then be maintained as to "where" in the content 120(*c*) the images were found such that users may jump to segments involving that actor.

In another example, the client 104 may provide a feature (e.g., which may be initiated by a button on a remote control) to identify current images that are being output, such as landmarks, actors, and so on, which may be displayed proximally to the respective image. For instance, text may be output that concurrently givens the names of actors on the screen, a name of a character an actor is portraying, and so on.

In yet another example, this information (e.g., the identification of the image) may be further leveraged to search for related information, such as news, data, gossip, upcoming content with that image (e.g., actor), and so on. The search results may be output in a variety of ways, such as in a window (e.g., a "popup"), an overlay, and so on.

The image module 126 may also identify warnings, such as a braking news graphic on another channel that is not currently being output and cause that other channel to be automatically output, regardless of whether the user is currently watching that channel. In this way, the warning may be used to implement an action without separate signaling on the part of the head end 102(m). A variety of other examples are also contemplated, further discussion which may be found in relation to the following example procedures.

Example Procedures

The following discussion describes image recognition techniques that may be implemented utilizing the previously described environment, systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the environment 100 of FIG. 1 and the system 200 of FIG. 2, respectively.

Figure 3:
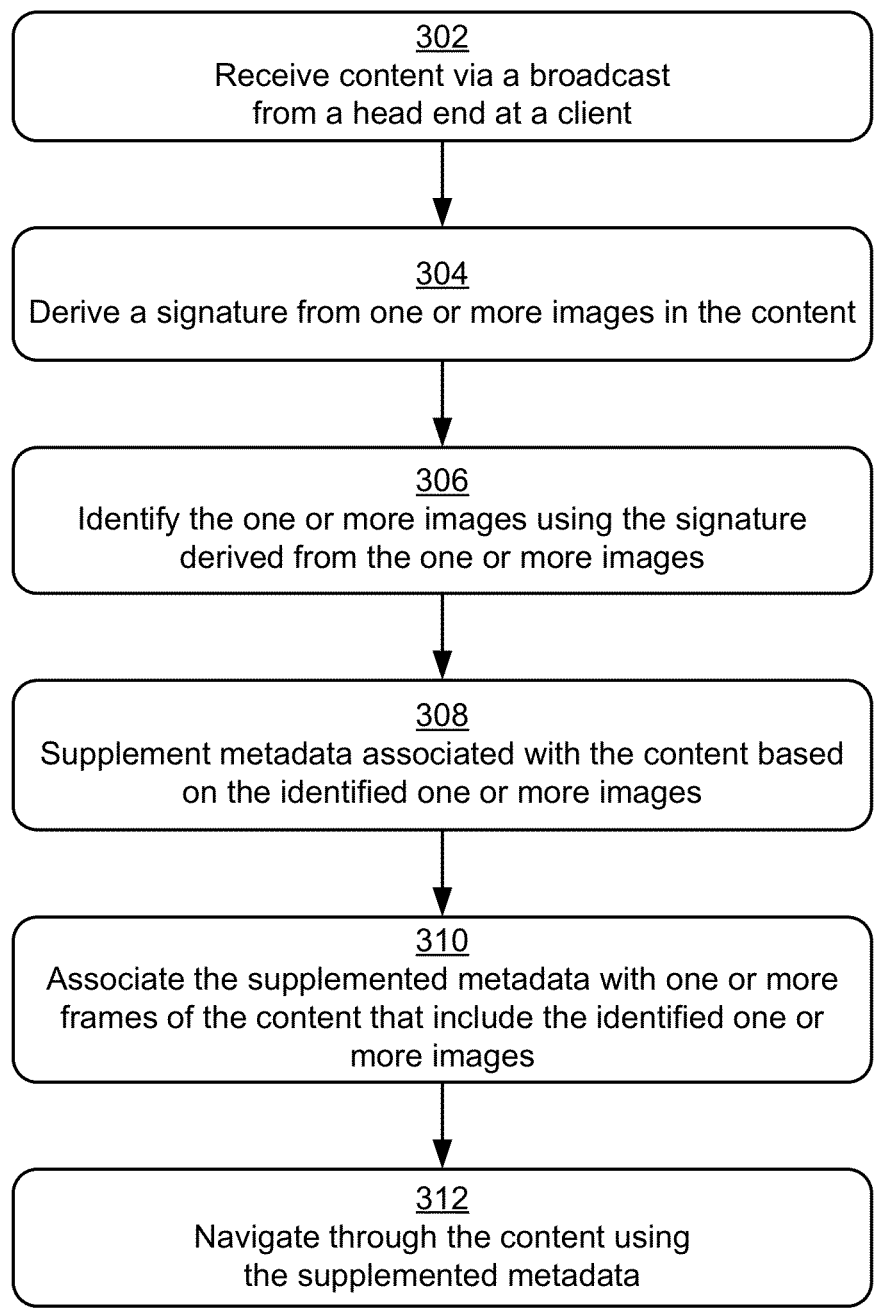
FIG. 3 is a flow diagram depicting a procedure in an exemplary implementation in which image recognition techniques are utilized to supplement metadata associated with content.

FIG. 3 is a flow diagram depicting a procedure 300 in an exemplary implementation in which image recognition techniques are utilized to supplement metadata associated with content. Content is received via a broadcast from a head end at a client (block 302). The client 104, for instance, may received television content (e.g., television programs including movies and video-on-demand) that are streamed over a network connection 108 to the client 104.

A signature is derived from one or more images in the content (block 304). The client 104, for instance, may execute the image module 126 to examine the content 114(n) as it is streamed over the network connection 108, as the content 114(n) is stored as content 120(c) in the memory, as the content 120(c) is output from the memory 118 (e.g., using DVR functionality), and so on. A signature may then be derived which represents characteristics of the image, such as surface analysis, entropy, Hough lines, and so on. The signature may be derived through this examination in a variety of ways, further discussion of which may be found in relation to FIG. 4.

The one or more images are then identified using the signature derived from the one or more images (block 306). For example, the signature derived from the one or more images may be compared with signatures of known images to find a "match", such as a relatively high likelihood that the images contain similar subject matter. In this way, the image module 126 may determine "what" is contained in the image 128, such as particular faces 130, logos 132, landmarks 134, and so on.

Metadata that is associated with the content is supplemented based on the identified one or more images (block 308). The metadata 116, for instance, may be streamed with the content 114(n) over the network connection 108. Data may also be obtained (e.g., via the network connection 108 from a website, the head end 102(m), and so on) based on an identified image, such as a particular actor, landmark, logo, and so on. This obtained data may then also be associated with the metadata 116 to add additional functionality.

For instance, the supplemented metadata may be associated with one or more frames of the content that include the identified one or more images (block 310). Continuing with the previous example, the other data may be associated with particular segments 214, 216, 218 of the content 120(c). These segments may be defined in a variety of ways, such as a threshold amount of inclusion in a particular number of frames, e.g., an image is included in "X" number of sequential frames. This association may be utilized in a variety of ways, such as to navigate through the content using the supplemented metadata (block 312), e.g., to block output of particular segments, skip output of segments which do not meet a threshold for an image, and so on.

Figure 4:
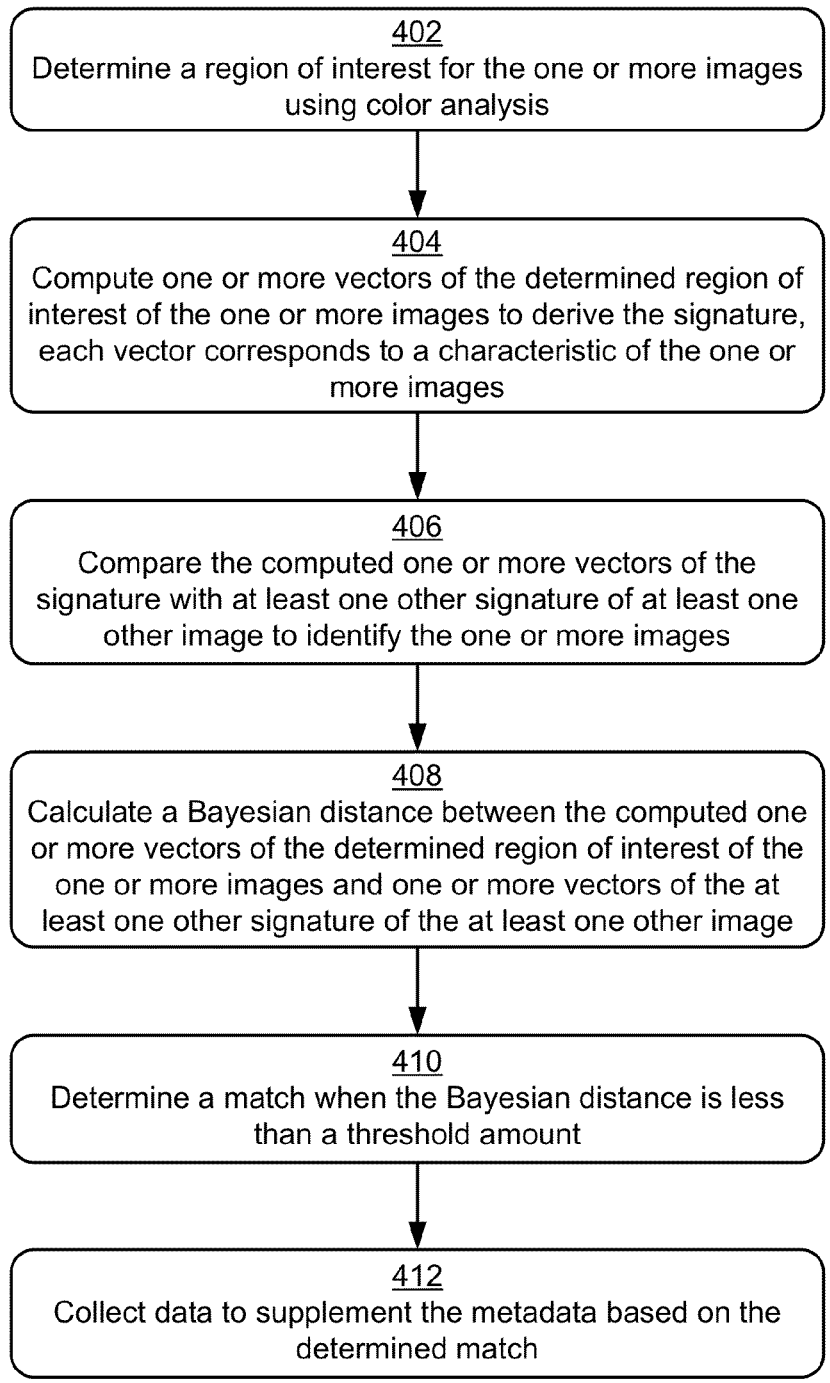
FIG. 4 is a flow diagram depicting a procedure in an exemplary implementation in which a signature is generated of an image which is used to identify the image based on comparison with other signatures.

FIG. 4 depicts a procedure 400 in an exemplary implementation in which a signature is generated of an image which is used to identify the image based on comparison with other signatures. A region of interest is determined for the one or more images using color analysis (block 402). For example, to locate an image of a face, the image module 126 may perform a colorimeter analysis for human flesh, such as for hue, size and so on. A front face search may then be done on the region of interest to determine a likelihood that the region contains a face. A variety of other examples are also contemplated.

One or more vectors of the determined regions of interest of the one or more images are computed to derive the signature, with each vector corresponding to a characteristic of the one or more images (block 404). The vectors, for instance, may correspond to surface analysis, entropy, Hough lines, and so on of the image.

The computed one or more vectors of the signature are then compared with at least one other signature of at least one other image to identify the one or more images (block 406). A Bayesian distance is then calculated between the computed one or more vectors of the determined region of interest of the one or more images and one or more vectors of the at least one other signature of the at least one other image (block 408). A match may then be determined when the Bayesian distance is less than a threshold amount (block 410).

For example, a Bayesian distance between stored and "new" data (e.g., the image) may be calculated, with a hash table used to reduce a search set. When the Bayesian distance is short, indicating a relatively high comparison likelihood, a determination may be made that the images "match", e.g., are substantially similar.

Data is then collected to supplement the metadata based on the determined match (block 412). Continuing with the previous example, an event may be triggered when a frame includes an identified image to mark the video frame with metadata of the corresponding match.

Figure 5:
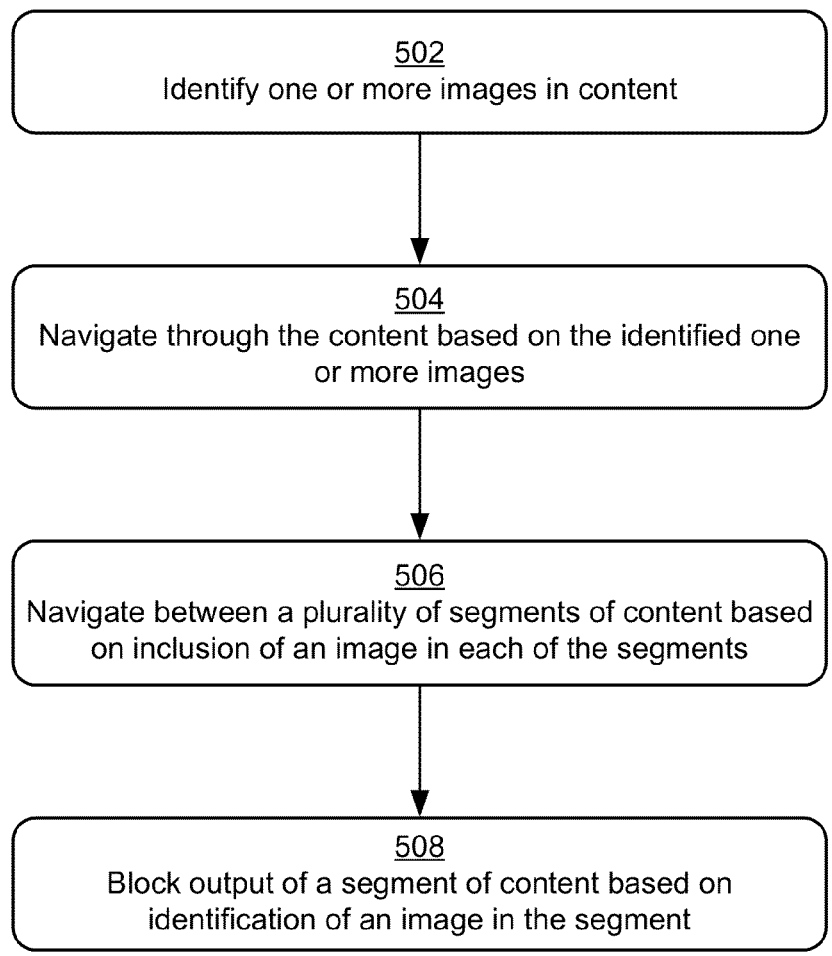
FIG. 5 is a flow diagram depicting a procedure in an exemplary implementation in which navigation is performed through content based on identification of images within the content.

FIG. 5 depicts a procedure 500 in an exemplary implementation in which navigation is performed through content based on identification of images within the content. One or more images are identified in content (block 502). For example, the techniques previously described in relation to FIG. 4 may be employed to identify images, such as to analyze the images and generate signatures for comparison.

Navigation is performed through the content based on the identified one or more images (block 504). A variety of navigation techniques may be employed. For example, navigation may be performed between a plurality of segments of content based on inclusion of an image in each of the segments (block 506). As previously described in relation to FIG. 2, for instance, the client 104 may navigate between segments 214,

216, 218 of the content 120(*c*) that face 220, 220', 220", such as to skip intermediate segments that do not include the face.

In another example, output of a segment of content may be block based on identification of an image in the segment (block 508). For example, the image may contain something that is determined to be potentially harmful to a minor, such as nudity, an image of a gun, and so on. Therefore, segments that include the image may be blocked from output. In another example, a corporate logo may be identified that is not to be output in a certain market. In such an instance, output of segments of content that include the logo may be prevented from output. A variety of other examples are also contemplated.

Conclusion

Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method implemented by a computing device, the method comprising:
    identifying an image that includes material determined to be potentially harmful to a child, the image included in one of a plurality of frames that form a segment of content;
    supplementing metadata associated with the content based on the identified image; and
    navigating through the content using the supplemented metadata.

2. A method as described in claim 1, wherein supplementing the metadata associated with the content based on the identified image includes marking one or more frames of the content that include the identified image with metadata.

3. A method as described in claim 1, further comprising associating the supplemented metadata with one or more frames of the content that include the identified image.

4. A method as described in claim 1, further comprising blocking output of each of the plurality of frames that form the segment of content based on the identification.

5. A method as described in claim 1, wherein the content includes a plurality of segments.

6. A method as described in claim 5, further comprising supplementing the metadata of each segment of the plurality of segments that includes the identified image.

7. A method as described in claim 1, the material not including a body part.

8. One or more computer readable storage devices comprising instructions stored thereon that, responsive to execution by a computing device, causes the computing device to perform operations comprising:
    identifying an image that includes material determined to be potentially harmful to a child, the image included in two or more of a plurality of segments of content; and
    navigating through the plurality of segments of the content based on the identified image.

9. One or more computer readable devices as described in claim 8, the operations further comprising supplementing metadata associated with the content based on the identification.

10. One or more computer readable devices as described in claim 9, wherein the navigating is based on the supplemented metadata.

11. One or more computer readable devices as described in claim 8, the operations further comprising associating metadata with each of the plurality of segments that includes the identified image.

12. One or more computer readable devices as described in claim 11, wherein the navigating is based on the metadata associated with each of the plurality of segments that include the identified image.

13. One or more computer readable devices as described in claim 8, the material not including a body part.

14. A computing device comprising one or more modules implemented at least partially in hardware, the one or more modules configured to perform operations comprising:
    identifying an image that includes material determined to be potentially harmful to a minor, the image included in one of a plurality of frames that form a segment of content; and
    navigating through the content until the identified image is no longer included in another of the plurality of frames that form the segment of content.

15. A computing device as described in claim 14, the operations further comprising supplementing metadata associated with the content based on the identified image.

16. A computing device as described in claim 15, wherein the navigating is based on the supplemented metadata.

17. A computing device as described in claim 15, the operations further comprising associating the supplemented metadata with each frame of content that includes the identified image.

18. A computing device as described in claim 14, wherein the image includes a logo.

19. A computing device as described in claim 14, the navigating being responsive to receiving an input from a user.

20. A computing device as described in claim 14, the navigating being responsive to receiving an input via a user interface.

* * * * *